June 27, 1961 J. DVOŘÁČEK 2,989,872
DEVICE DESIGNED FOR TRANSMISSION OF A FORCE ACTING
RECTILINEARLY UPON THE TWISTING OF
A TORSIONAL ELEMENT
Filed Dec. 29, 1959
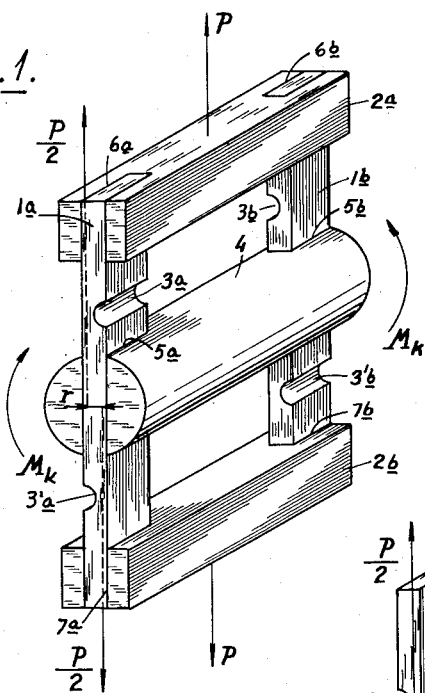
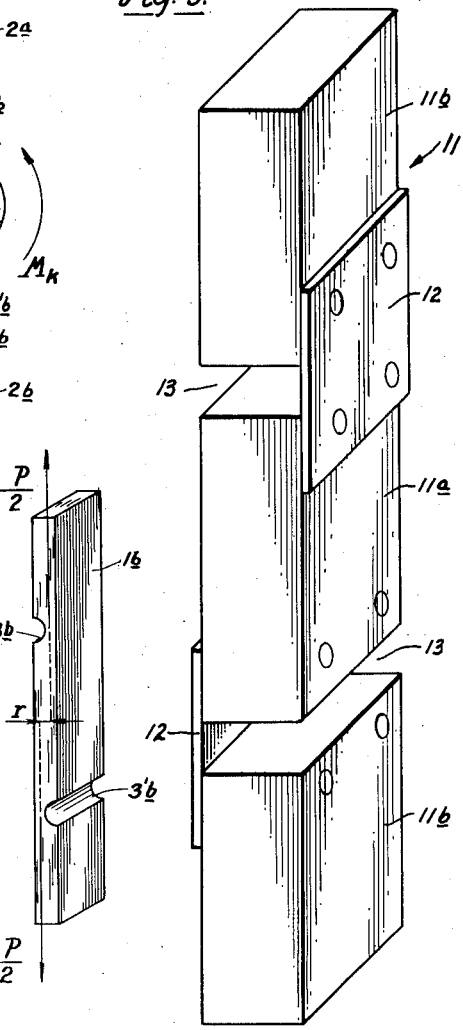
INVENTOR.
Josef Dvořáček
BY Richard Low
    Agt United States Patent Office 2,989,872
Patented June 27, 1961

2,989,872
DEVICE DESIGNED FOR TRANSMISSION OF A FORCE ACTING RECTILINEARLY UPON THE TWISTING OF A TORSIONAL ELEMENT
Josef Dvořáček, Varnsdorf, Czechoslovakia, assignor to Vyzkumny a zkusebni letecky ustav, Letnany, near Prague, Czechoslovakia
Filed Dec. 29, 1959, Ser. No. 862,639
Claims priority, application Czechoslovakia Jan. 5, 1959
4 Claims. (Cl. 74—99)

This invention relates generally to the conversion of a rectilinearly acting force into a torque or twisting moment, and more particularly is directed to devices for twisting or torsionally stressing a torsional element in response to the application of a rectilinearly acting force, for example, in dynamometers and force or stress measuring apparatus employing magnetostrictive torsional sensing elements.

A magnetostrictive torsional sensing element, as mentioned above, generally comprises a torsional body which is either longitudinally or cylindrically magnetized by the passage of an electric current through an exciting winding and which is provided with a pick-up coil in which an electrical signal is induced in response to the twisting or torsional stressing of the torsional body. Such induced electrical signal is proportional to the torsional stressing of the torsional body and may be used to operate a suitable indicating or recording device which shows the magnitude of the torsional stressing of the torsional body, and hence of the measured force causing such stressing of the body. When the force to be measured acts rectilinearly, it is necessary to provide a mechanical device by which the rectilinearly acting force is converted into a torque effective to torsionally stress or twist the torsional body of the sensing element. All of the existing devices for twisting or torsionally stressing the torsional body of a magnetostrictive sensing element of the described character include a pair of links or rods connected to each end of the torsional body at diametrically opposed locations spaced radially from the longitudinal axis of the torsional body and extending tangentially from the latter in opposed directions, and yokes or crossheads extending parallel to the longitudinal axis of the torsional body, at opposite sides of the latter, and each being connected, at each of its opposite ends, to a link or rod of the pair of links or rods connected to the adjacent end of the torsional body so that, when the yokes or crossheads are urged toward or away from each other by a rectilinearly acting force, the torsional body of the magnetostrictive sensing element is correspondingly twisted.

When the above described existing devices for twisting a torsional body in response to the application of a rectilinearly acting force are employed in connection with forces of large magnitude, the strength requirements of the connections between the links or rods and the torsional body, at the opposite ends of the latter, make it necessary to provide connecting means having relatively large dimensions so that the moment arms of each pair of links or rods with respect to the longitudinal axis of the torsional body are relatively large, thereby producing excessive torques acting on the torsional body and making it necessary to provide the latter with an undesirably large diameter. Furthermore, in such existing devices, the links or rods must be connected to the torsional body and to the yokes or crossheads in such a way as to absolutely maintain the axes of the yokes and the torsional body in a single plane, since any departure of the axes of the yokes and torsional body from the single plane, either by reason of damage to the bearings supporting the torsional body or inaccuracy in connecting the links or rods to the yokes and torsional body, affects the relationship of the torque applied to the torsional body with respect to the rectilinear force which is applied, and thereby destroys the accuracy of the measurement or indication of such force. The fact that it is necessary to connect two pairs of rods or links to the torsional body and to the yokes or crossheads makes it difficult to maintain the necessary coplanar relationship of the axes of the yokes and the torsional body.

Accordingly, it is an object of this invention to provide improved devices for twisting or torsionally stressing a torsional body, for example, of a magnetostrictive sensing element, in response to the application of a rectilinearly acting force, and wherein the maintenance of an accurate relationship between the applied force and the torsional stressing of the torsional body is both simplified and ensured.

A further object is to provide devices of the described character of relatively simplified construction so as to reduce the cost thereof as well as to decrease the possibility of operating failures.

In accordance with an aspect of this invention, a torsional body, for example, of a magnetostrictive sensing element, is twisted or torsionally stressed in response to the application of a rectilinearly acting force to yokes or cross heads extending parallel to the axis of the torsional body at opposite sides of the latter by means of a single rod-like member extending diametrically across each end of the torsional body and secured, at the center of the rod-like member, to the torsional body, while the opposite ends of each rod-like member are secured to the yokes or crossheads at the opposite sides of the torsional body, and each rod-like member is formed with two recesses opening at opposed faces thereof at locations between the torsional body and the yokes or crossheads so that the rectilinear force applied to the yokes or crossheads tends to angularly deflect the central portion of each rod-like member about the axis of the torsional body. Further, the arrangements of the recesses in the rod-like members connected to the opposite ends of the torsional body are reversed, whereby the angular deflections of the central portions of the two rod-like members are in opposite directions in response to the application of a rectilinear force to the yokes or crossheads for causing torsional stressing or twisting of the torsional body.

It is an advantage of the device having the above characteristics of the present invention that the extent of the angular deflection of the central portions of the rod-like members secured to the opposite ends of the torsional body is dependent upon the depth of the recesses formed in such members so that, where the twisting or torsional stressing of the torsional body is to be effected in response to a large rectilinearly acting force, such recesses can be given a relatively small depth so as to minimize the resulting torsional stressing or twisting of the torsional body and thereby make possible the use of a torsional body having a relatively small diameter. Further, the foregoing feature of the device embodying the present invention makes it possible to obtain the torsional stressing or twisting of the torsional body within a particular range even though the applied rectilinearly acting forces may vary over a large range, merely by providing several interchangeable sets or pairs of rod-like members having recesses therein of different depths.

The above, and other objects, features and advantages of the invention, will be apparent in the following detailed description of illustrative embodiments thereof which is to be read in connection with the accompanying drawing forming a part hereof, and wherein:

FIG. 1 is a perspective view of a device embodying the present invention;

FIG. 2 is a perspective view of one of the rod-like members included in the device of FIG. 1; and FIG. 3 is a perspective view of a modified form of rod-like member that may be used in place of the member of FIG. 2 in the device of FIG. 1.

Referring to the drawing in detail, and initially to FIGS. 1 and 2 thereof, it will be seen that, in accordance with the present invention, a rectilinearly acting force P is made to torsionally stress or twist a torsional body 4 by applying the force P to two crossheads or yokes 2a and 2b which extend parallel to the longitudinal axis of torsional body 4 at the opposite sides of the latter, for example, above and below the torsional body, as shown in FIG. 1, and by connecting the yokes or crossheads 2a and 2b to torsional body 4 by means of a single pair of rod-like members 1a and 1b.

The rod-like members 1a and 1b extend, at their central portions, through diametrically extending slots 5a and 5b, respectively, formed in the opposite ends of torsional body 4, and the rod-like members 1a and 1b are suitably secured to the adjacent ends of the torsional body. The opposite ends of rod-like members 1a and 1b are received in slots 6a and 7a and in slots 6b and 7b formed in the opposite ends of yokes or crossheads 2a and 2b, and the ends of the rod-like members are suitably secured to the ends of the yokes or crossheads. Since the slots 6a and 6b are laterally centered with respect to yoke or crosshead 2a and the slots 7a and 7b are laterally centered with respect to the yoke or crosshead 2b, while the diametrical slots 5a and 5b are centered with respect to the longitudinal axis of torsional body 4, it is apparent that the longitudinal axes of the yokes or crossheads 2a and 2b and of the torsional body 4 all lie in a single plane.

In accordance with the present invention, the rod-like member 1a has recesses 3a and 3'a formed in the opposite sides or faces thereof at locations intermediate torsional body 4 and yokes or crossheads 2a and 2b, respectively. Similarly, rod-like member 1b is formed with recesses 3b and 3'b in the opposite sides or faces thereof at locations intermediate torsional body 4 and crossheads or yokes 2a and 2b, respectively. Further, the positions of the recesses in the rod-like members 1a and 1b are reversed, that is, the recesses 3a and 3b which are provided in members 1a and 1b, respectively, between torsional body 4 and crosshead 2a are disposed at the opposite sides or faces of the respective rod-like members, and the other recesses 3'a and 3'b are similarly formed in the opposite sides or faces of the respective rod-like members 1a and 1b.

The above described device operates as follows:

When the rectilinearly acting force P is applied at the centers of the yokes or crossheads 2a and 2b, each of the rod-like members 1a and 1b transmits one-half of the force P. As a result of the formation of the recesses 3a and 3'a in the opposite sides or faces of the member 1a, and similarly as a result of the formation of the recesses 3b and 3'b in the opposite sides or faces of the member 1b, there is an asymmetrical transmission of the force $P/2$ through each of the rod-like members 1a and 1b, thereby generating a couple or torque $M_k$ equal to $P/2 \cdot r$, wherein $r$ represents the distance between the medial planes of the material remaining at the locations of the recesses 3a and 3'a, respectively, and at the locations of the recesses 3b and 3'b, respectively. The torque or force couple thus generated causes angular deflection of the central portion, that is, the portion between the respective recesses, of each of the rod-like members 1a and 1b about the longitudinal axis of the torsional body 4, and such angular deflection is transmitted to the adjacent end of the torsional body by reason of the secure attachment of the rod-like members 1a and 1b to the opposite ends of the torsional body. By reason of the fact that the recesses 3a and 3'a and the recesses 3b and 3'b are oppositely arranged in the respective rod-like members, it will be apparent that the angular deflections of the central portions of the members 1a and 1b are in opposite directions, thereby to cause torsional stressing or twisting of the body 4.

It will be apparent that the distance $r$ of the couple or turning moment may be either increased or decreased by increasing or decreasing, respectively, the depth of the recesses 3a, 3'a, 3b and 3'b, thereby to correspondingly vary the magnitude of the torsional stressing of body 4. Thus, if the force P is relatively small, the recesses of rod-like members 1a and 1b are made relatively deep, thereby to ensure an adequate torsional stressing of the body 4. On the other hand, if the force P is very large, the recesses of the rod-like members 1a and 1b are made relatively shallow, thereby to maintain the torsional stressing of the body 4 within reasonable limits, so that the same torsional body 4 can be employed for both large and small forces merely by using rod-like members having suitably dimensioned recesses therein.

Although FIG. 1 of the drawing illustrates the use of the device in torsionally stressing body 4 in response to a rectilinearly acting tension load applied to the yokes or crossheads 2a and 2b so as to urge the latter apart, it will be apparent that the illustrated device may be also used for compressive loads tending to displace the yokes or crossheads towards each other.

Although the rod-like members 1a and 1b of the device illustrated in FIG. 1 are each of one-piece construction, it will be apparent that each of those rod-like members may be replaced by a similarly functioning rod-like member of multiple-piece construction, for example, by the rod-like member 11 of FIG. 3.

The rod-like member 11 is interrupted, that is, is formed of a central portion 11a and two end portions 11b arranged in end-to-end, spaced apart relationship to the central portion 11a and being secured to the latter by means of strong steel strips or plates 12 which are disposed at opposite sides of the member 11 so that the gaps between central portion 11a and end portions 11b define recesses 13 and 13' opening at the opposite sides or faces of the rod-like member 11 and corresponding to the recesses 3a and 3'a or the recesses 3b and 3'b of the previously described members 1a and 1b.

It will be apparent that, by reason of the extreme simplicity of the previously described structure employed in connection with the present invention for effecting twisting or torsional stressing of a torsional body 4 in response to the application of a rectilinearly acting force, such structure can be economically and accurately manufactured.

Although illustrative embodiments of the invention have been described in detail herein with reference to the accompanying drawing, it is to be noted that the invention is not limited to those precise embodiments, and that various changes and modifications may be effected therein without departing from the scope or spirit of the invention, except as defined in the appended claims.

I claim:

1. A device for converting a rectilinearly acting force into a torsional load, comprising an elongated torsional body, parallel first and second rod-like members having central portions extending diametrically with respect to said body at the opposite ends of the latter and being connected to said body, and first and second crossheads extending parallel to the longitudinal axis of said torsional body and being intended to have the rectilinearly acting force applied thereto, said first and second rod-like members being connected, at one end, to the opposite ends of said first crosshead and, at the other end, to the opposite ends of said second crosshead, so that said rod-like members transmit the rectilinearly acting force between said crossheads, each of said rod-like members having two recesses therein respectively opening at the opposite sides of the rod-like member and located between said torsional body and said first and second crossheads, respectively, so that the rectilinearly acting force is asymmetrically transmitted through said rod-like members to cause angular deflection of said central portions about said longitudinal axis of the torsional body, said recesses of said first rod-like member opening at the sides of the latter which are opposed to the sides of said second rod-like member at which the corresponding recesses of the latter open so that said central portions of the first and second rod-like elements undergo angular deflection in opposite directions, thereby to torsionally load said body in response to the force acting rectilinearly on said crossheads.

2. A device as in claim 1; wherein each of said first and second rod-like members is of one-piece construction.

3. A device as in claim 1; wherein each of said first and second rod-like members is of multi-piece construction and has end portions spaced from said central portion to define gaps therebetween, and relatively flat connecting members joining said central portion to said end portions at opposite sides of said rod-like member, so that said gaps define said recesses which open at the sides of the rod-like member opposed to the related connecting members.

4. A device as in claim 1; wherein said torsional body has parallel slots extending diametrically through said opposite ends thereof and receiving said central portions of the rod-like members for transmitting the angular deflection of each of said central portions to the adjacent end of said torsional body.

References Cited in the file of this patent

UNITED STATES PATENTS 2,485,735    Hyde _____ Oct. 25, 1959